United States Patent [19]
Pompa

[11] 3,948,059
[45] Apr. 6, 1976

[54] CABLE PLOW CHUTE MULTI-LAY CABLES

[75] Inventor: John R. Pompa, Moline, Ill.

[73] Assignee: J. I. Case Company, Racine, Wis.

[22] Filed: Sept. 11, 1974

[21] Appl. No.: 505,172

[52] U.S. Cl. ................................................ 61/72.6
[51] Int. Cl.² ........................ E02F 5/00; F16L 1/02
[58] Field of Search .......... 61/72.6, 72.5, 72.7, 72.1

[56] References Cited
UNITED STATES PATENTS

| | | | |
|---|---|---|---|
| 3,111,007 | 11/1963 | Ryan | 61/72.1 |
| 3,222,876 | 12/1965 | Harmstorf | 61/72.6 |
| 3,338,060 | 8/1967 | Harmstorf | 61/72.4 |
| 3,363,423 | 1/1968 | Davis | 61/72.6 |
| 3,395,545 | 8/1968 | Mendaloff | 61/72.6 |
| 3,405,533 | 10/1968 | Fries | 61/72.6 |
| 3,417,571 | 12/1968 | Kelley | 61/72.6 |

Primary Examiner—Paul R. Gilliam
Assistant Examiner—David H. Corbin
Attorney, Agent, or Firm—Cullen, Settle, Sloman & Cantor

[57] ABSTRACT

A cable guiding and dispensing chute for use with a ground slitting or trenching implement includes two members releaseably secured together to define a J-shaped box-like structure to guide a plurality of cables which are being dispensed from a drum or reel and being placed in a slot in the ground. One of the cable chute members includes a pair of parallel, J-shaped sidewalls having different widths and being interconnected by a first cable guiding web. The second of the cable chute members is pivotally supported by the J-shaped sidewalls and includes a single sidewall component adjacent to and complementary with the smallest of said J-shaped sidewalls to define a chute wall conforming in size and shape with the largest of said J-shaped sidewalls. A plurality of additional cable guiding webs are connected to the second-member sidewall component and project substantially to the largest J-shaped sidewall to define, with said first web, a plurality of cable guiding conduits. Releaseable locking means are provided to maintain the first and second cable chute members in a cable dispensing position, but the second member is designed to be pivotally withdrawn from the first member to facilitate the removal or insertion of a plurality of cables.

9 Claims, 4 Drawing Figures

U.S. Patent  April 6, 1976  3,948,059
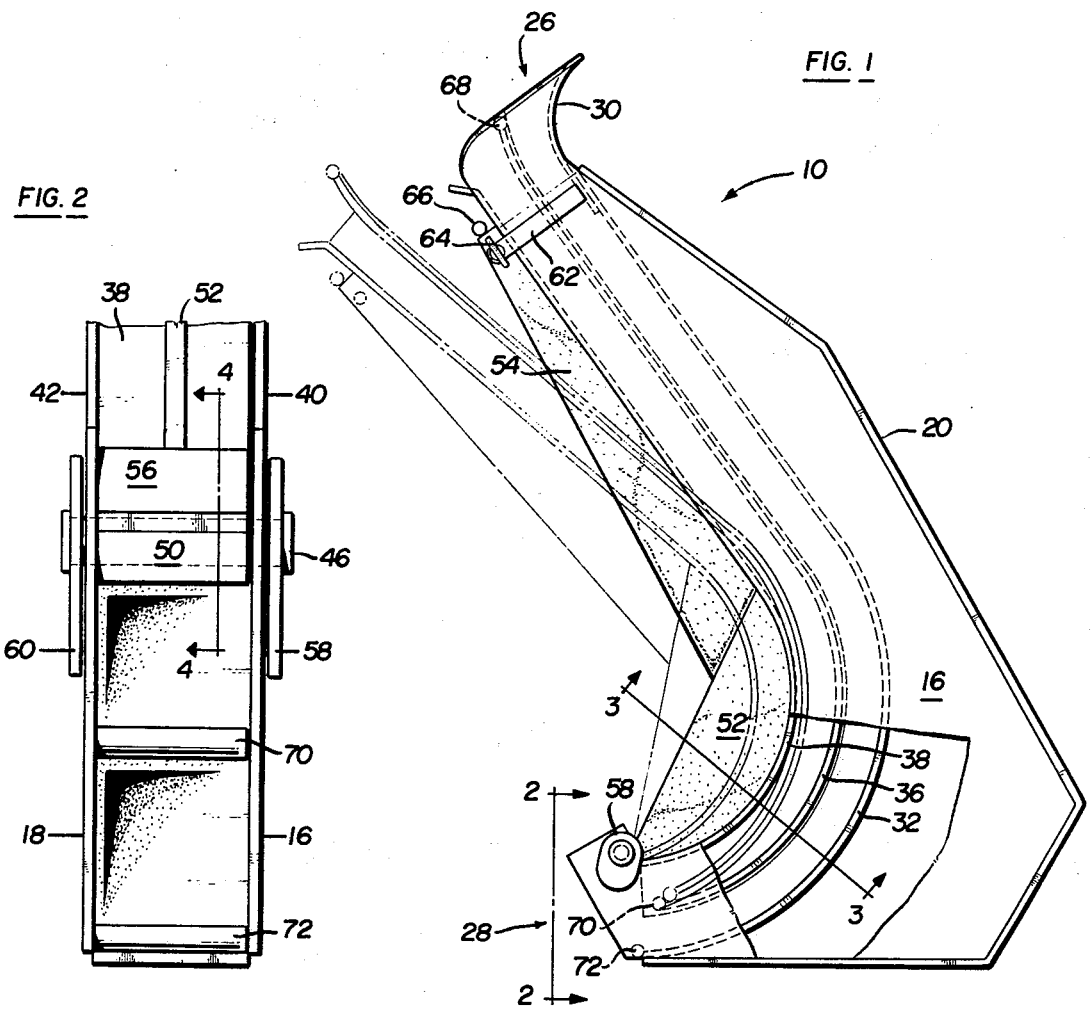
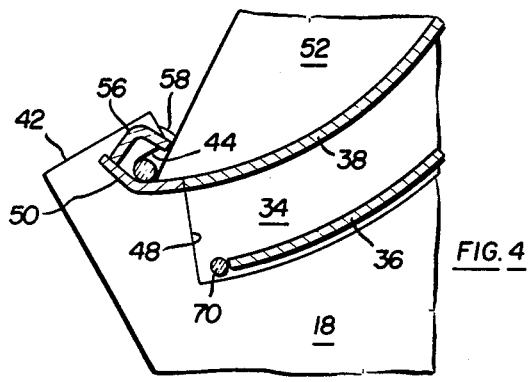
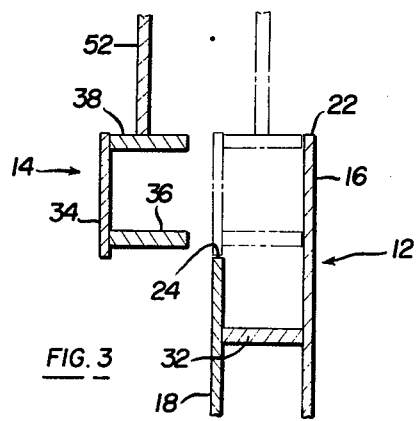

CABLE PLOW CHUTE MULTI-LAY CABLES

BACKGROUND OF THE INVENTION

1. Field of the Invention

The present invention relates generally to a cable guiding chute suitable for use in combination with an earth slitting implement to guide and position a plurality of cables being dispensed from a cable reel or drum. More specifically, the present invention relates to a cable chute having a pivotally removable component to enable the expeditious insertion or withdrawal of a plurality of cables from the cable chute assembly.

2. The Prior Art

Various cable guiding chutes have been proposed by the prior art and include varying configurations and design. One very basic shortcoming in conventional cable chutes is the failure to provide an apparatus capable of (1) simultaneously guiding and laying a plurality of cables, or the like, without requiring a complicated structure, and (2) providing accessibility to the cable guiding conduits to remove, insert or replace cables as the need arises.

An example of the prior art includes, first, U.S. Pat. No. 3,395,545 to Mendaloff, which discloses a cable guiding compartment that is releasably maintained within the chute. This patent, rather than suggesting the present invention, illustrates one of the basic problems in the art, i.e. non-accessibility to the cable guiding conduits. Further, the suggested Mendaloff chute does not include the provision of cable guiding separators extending the length of the chute, thereby requiring additional guiding structure in the form of rollers.

Another example of prior art patents which broadly teach the idea of simultaneously guiding and laying a plurality of cables includes U.S. Pat. Nos. 3,222,876 and 3,338,060 to Harmstorf. These patents likewise do not teach the use of any structure to yield accessibility to the guiding chutes to accomodate ease in removing or inserting cables or the like.

Several prior art patents include a general teaching of a removeable component to provide accessibility to the interior of the cable guiding chute, examples of such prior art being U.S. Pat. Nos. 3,363,423 to Davis, 3,111,007 to Ryan, 3,405,533 to Fries and 3,417,571 to Kelley. It can readily be seen from these patents that there is no hint of the structure proposed by the present application which would yield accessibility to the interior of the cable chute capable of dispensing and guiding a plurality of cables or the like.

Yet another embodiment of a cable chute for dispensing a plurality of cables includes an arrangement consisting of a plurality of individual conduit members which may be connected to one another in a "piggy back" manner. This particular arrangement is highly undesireable for several reasons, including (1) in accessibility to the interior of any one or more of the cable guiding conduits, (2) the requirement of mounting structure for attaching each individual cable guiding conduit (3) the necessity of feeding cable longitudinally through the cable guiding conduit rather than by lateral insertion as proposed by the present invention, and (4) the time required for attaching each individual cable guiding conduit.

The present invention overcomes the shortcomings of the prior art cable chutes while providing numerous other advantages as will become apparent through study of the remaining portions of this application and through use of the suggested structure.

SUMMARY OF THE INVENTION

The cable chute proposed by the present invention includes a generally J-shaped box structure comprised of first and second primary components which define a plurality of cable guiding conduits. The first of these components includes a pair of vertically oriented, generally parallel J-shaped sidewall components which are interconnected by a generally perpendicular first web member extending substantially the length of the chute. One of the J-shaped sidewall members has a width less than the other sidewall member in order to accomodate the second component in mating relationship to define the cable guiding conduits.

The second component is pivotally supported by and releaseably secured to the first component so that it can be withdrawn to enable expeditious lateral insertion of cables into the chute. The structural elements defining the second component includes a supporting sidewall member adjacent to and contiguous with the smaller of the two sidewall members to define a wall which is similar in size and shape to the larger of the sidewall member. A pair of additional webs are connected to the supporting sidewall of the second component and extend substantially to the larger sidewall member to define the plurality of cable guiding conduits. The additional web member are generally parallel to the first web member and likewise extend generally the length of the chute.

Thus, the present invention overcomes the shortcomings in the prior art by providing a chute assembly which is capable of dispensing a plurality of cables and which can be easily inserted into or withdrawn from the chute. Other advantages of the present invention will become apparent to those skilled in the art upon review of the construction and operation of the chute proposed by the present invention, as discussed more fully below.

BRIEF DESCRIPTION OF THE DRAWINGS

FIG. 1 is a side elevational view of the cable chute proposed by the present invention for guiding and dispensing a plurality of cables, plastic pipes or the like.

FIG. 2 is a vertical elevational view along line 2—2 in FIG. 1, illustrating the cable exit region at the lower rear portion of the cable chute.

FIG. 3 is an exploded sectional view illustrating the pivotally removeable divider component of the cable chute.

FIG. 4 is a cross-sectional view taken along lines 4—4 of FIG. 2, illustrating the manner in which the removeable component of the chute is pivotally supported on the sidewall members.

DETAILED DESCRIPTION OF THE INVENTION

As shown on the drawings, the present invention relates to a cable chute 10 for guiding a plurality of cables, plastic pipes or the like which are being dispensed from a cable reel or drum for placement into a slot or trench cut in the ground. The preferred environment for the cable chute 10 is in conjunction with a ground slitting blade as described in greater detail in U.S. Pat. No. 3,363,423 to Davis, which is incorporated herein by reference. As set forth in the Davis patent, the ground slitting blade is connected to an elevatable platform at the rear of a prime mover such as a crawler tractor. The cables or pipes are dispensed from one or a plurality of cables or reels which are carried by the prime mover and are guided into position within the slot in the ground by the cable chute 10. The cable is fed into the chute as the prime mover pulls the blade through the ground, while a vibratory member including, for example, rotating eccentric weights vertically vibrates the blade. Linkage members may interconnect the blade and the chute to reduce the transmission of vibratory motion and, if employed, would be connected to the chute by support brackets (not shown).

The chute itself is comprised of first and second members 12 and 14, respectively, which are pivotally interconnected as will be more fully discussed below. The first member 12 constitutes the major portion of the chute and is that portion which is connectible to the ground slitting blade, whereas the second member 14 is a removeable component which facilitates the insertion or removal of cables from the chute.

The first component 12 includes a pair of generally parallel, vertically oriented J-shaped sidewall members 16 and 18, which are interconnected along their respective leading and lower edges by one or a plurality of frame members 20. As best illustrated in FIG. 3, sidewall member 16 is wider than sidewall member 18 so as to define non-aligned trailing edges 22 and 24 to accomodate the pivotally removeable second component 14 for defining a plurality of cable guiding conduits.

The upper portion of the sidewall plates 16 and 18 define a cable entrance region 26 while the lower rear portion of these sidewall members define a cable exit region 28. The cable entrance region 26 includes a curved plate 30 which define the uppermost portion of one of the cable guiding conduits. Plate 30 terminates at its lower end in overlapping relationship with the top of a first J-shaped web member 32 which is interconnected between the sidewall components 16 and 18 and extends generally from the cable entrance region to the cable exit region. As will become apparent from the following discussions, the sidewall componets 16 and 18 and the first web member 32 define a portion of the cable guiding conduits, which are totally defined when the second component member 14 is in a cable dispensing position as illustrated in FIG. 1.

The pivotally removeable component 14 includes a supporting side plate 34 which is complementary in shape to sidewall member 18 to form a chute wall conforming in size and shape with the larger sidewall 16. An additional set of J-shaped webs 36 and 38 are connected to the supporting sidewall 34 for defining the cable guiding conduits. These additional pair of webs extend from the cable entry region 26 to the cable exit region 28 and have a width substantially the same as the width of the first web member 32 but are not connected to sidewall member 16. Thus the second component 14 is structurally separate from the first chute component 12 and can be pivotally removed therefrom to enable quick and easy insertion or removal of cables from the chute as desired.

The pivotal interconnection between components 12 and 14 is best illustrated in FIGS. 2 and 4, but does not per se constitute a novel arrangement in cable chute design. Rather, this particular pivotal arrangement complements the overall construction of the present chute and enables component 14 to be withdrawn from component 12 to accomplish one of the primary objectives of the present invention.

The pivotal supporting structure on component 12 includes a set of ears 40 and 42 at the lower rear portions of respective sidewall components 16 and 18. These ears include respective slots, one of which is illustrated by reference numeral 44 in FIG. 4. These slots receive a freely pivotal pin 46 which is rigidly connected to the lower portion of web 38, for example by welding. As best illustrated in FIG. 4, the supporting sidewall 34 of removable component 14 terminates at an edge 48 which is complementary and contiguous with a similar edge on member 34. The lower portion of the web 38 extends beyond the edge 48 to terminate in an upwardly turned portion 50 and is structurally reinforced substantially along its entire length by a pair of gussets 52 and 54. An angle member 56 having a length substantially the same as the dimension between the interior surfaces of sidewall members 16 and 18 is connected to the upturned portion 50 and the lower portion of gusset 52, for example by welding, to provide lateral stabilization during the pivotal movement of component 14. For the same purpose, a set of oblong shaped retainer washers 58 and 60 are employed on the lateral ends of pin 46 to engage the exterior surfaces of the ears. Thus, component 14 is supported for pivotal movement by pin 46 and may be removed from the primary component 12 by simply lifting pin 46 out of the slots 44.

As previously mentioned, the second removeable component 14 is releaseably secured to the component 12 during the cable dispensing and laying operation. The means for accomplishing this releaseable securement includes a pair of the ears, one of which is designated by reference numeral 62, which are connected to the exterior surfaces of the sidewall component 16 and 18 near the cable entrance region. Each of the ears includes a hole which mates with a hole in gusset member 54 to receive a cotter pin 64, or the like to lock component 14 into its cable dispensing position. A bar 66 is connected to the top of the gusset 54 for hand grasping to manually pivot member 14 away from or toward component 12.

OPERATION

Assuming that the components of the cable chute 10 are positioned as illustrated in FIG. 1 and that it is desired to position or re-position cables within the chute, the first step to open the cable chute is to grasp the handle bar 66 and remove the cotter pin 64. Then the component 14 can simply be pivotally lowered to a withdrawn position, for example as illustrated in phantom in FIG. 1. In this withdrawn position, the supporting sidewall 34 and the additional pair of webs 36 and 38 define a laterally open cable guidng conduit into which a cable can be easily inserted for a dispensing operation. Similarly, the sidewalls 16 and 18 in conjunction with the first web member 32 define and open-ended cable guiding conduit which is also accessible for easy cable insertion or removeable. After the cables have been inserted into the open channels, the component 14 is then pivoted upwardly into position with the first component 16 and the cotter pin 64 is reinserted into position through the holes in the ears and gusset plate 54 to secure the component parts of the chute for a dispensing operation. The next step is to activate the prime mover and to insert the blade and chute 10 into the ground so that the cables can be dispensed and guided through the chute into vertically layered position. In order to reduce the drag and to eliminate the possibility of damage to the cables as they are being dispensed through the chute, bars 68, 70 and 72 are connected to the ends of the webs as needed. Since bar 72 is positioned at the lower end of the first web 32, it can be connected to both sidewall members 16 and 18, whereas bars 68 and 70 are connected only to the supporting sidewall 34.

It can now be appreciated that the present invention affords a multitude of advantages including, for example, (1) a simplicity in construction, and (2) the ability to laterally insert or remove cables from the chute to provide expeditious operation and thereby reduce labor time. Other advantages and meritorious features will become apparent to those skilled in the art through usage and utilization of the present cable laying chute.

It is to be understood that the embodiment disclosed in the present application is merely exemplary and not intended to be limiting in any manner.

Having fully and completely described my invention, I now claim:

1. In a cable chute for guiding and dispensing a plurality of plastic pipes, electric cables or the like, said chute being suitable for attachment to the trailing end of a ground slitting implement and for insertion into the ground for a cable laying operation, comprising:
   first and second releasably secured members;
   said first member including a pair of generally parallel side plates and a first web connected with and generally perpendicular to said sidewalls, said first web including an arcuate portion defining a portion of a cable guiding conduit, one of said sidewalls having an arcuate edge generally parallel with the arcuate portion of said first web, and the other of said sidewalls having a greater width than said one sidewall to extend away from said first web beyond said edge in the same direction as said edge;
   said second member including a supporting side plate having an arcuate edge adjacent to and complementary with the arcuate edge of said one sidewall member, the supporting slide plate being coplanar with said one sidewall and extending generally parallel with said other side wall member, and a plurality of cable guiding webs connected to said supporting side plate and extending substantially to said other sidewall member, said cable guiding webs including arcuate portions generally parallel with the arcuate portion of said first web to define a plurality of cable guiding conduits.

2. The cable chute as defined in claim 1, further including means pivotally supporting said second member with respect to said first member, and means releaseably securing said first and second members together in a cooperating relationship to define said plurality of cable guiding conduits, said second member being pivotally withdrawable from said first member whereupon said supporting side plate and said plurality of cable guiding webs define laterally open channels to enable lateral removal or insertion of cables.

3. The cable chute as defined in claim 2, characterized by said sidewall members, said first web, said supporting side plate, and said plurality of cable guiding webs all having generally J-shaped configurations, defining, in combination, an upper entry region for the plurality of cables and a lower exit region for laying the cables horizontally in the ground invertically layered arrangement.

4. In an apparatus for laying a plurality of cables, plastic pipes or the like in a trench or slot cut in the ground by an earth working implement, comprising:
   first and second generally parallel sidewalls having similar configurations and sizes, said first sidewall being comprised of first and second plate sections and means releaseably securing said plate sections in contiguous, generally coplanar relationship, said first plate section having a width less than that of the second sidewall, and said second plate section having a width substantially equal to the difference in width of the second sidewall and the first plate section;
   a first web member interconnecting said second sidewall and said first plate section;
   a plurality of additional web members connected to said second plate section and extending substantially to, without being rigidly connected to, said second sidewall, said additional web members being generally parallel with said first web member to define a plurality of cable guiding conduits; and
   said additional web members and said second plate section defining a plurality of laterally opened channels upon disengagement of said releasable securing means and withdrawal from said first plate section to enable lateral insertion or removal of cables.

5. The cable laying apparatus as defined in claim 4, characterized by said second plate section being pivotally connected to said first plate section and said second wall to enable pivotal withdrawal of said second plate section to expose said laterally open channels for cable removal or insertion.

6. The cable laying apparatus as defined in claim 5, characterized by said webs including respective parallel arcuate portions to define directional changing regions for said cable guiding conduits.

7. In an apparatus for laying a plurality of cables, plastic pipes or the like in a trench or slot cut in the ground by an earth working implement, comprising:
   a pair of spaced, generally J-shaped sidewall members having generally aligned leading edges corresponding with a forward portion of the cable laying apparatus, said sidewall members having unequal widths to constitute minor and major members, and said members having non-aligned trailing edges;
   a web connected to each of said sidewall members and being generally perpendicular thereto, said web extending generally from the upper portion to the lower rear portion of said members and including an arcuate portion to define, in conjunction with said sidewalls, a portion of a cable guiding conduit;
   a divider component releasably secured to said sidewall members and including (a) a generally J-shaped side plate in the plane of the minor sidewall member having a width substantially the same as the difference in widths of the major and minor members, one edge of said side plate being adjacent the trailing edge of said minor member and another edge of said side plate being generally aligned with the trailing edge of said major member and (b) a plurality of cable guiding plates connected to said side plate and being generally perpendicular thereto to define, in conjunction with said web and sidewalls, a plurality of cable guiding conduits, said guiding plates including respective arcuate portions which are generally parallel to the arcuate portion of said web for directing said cables into a generally horizontal orientation for placement in the ground.

8. The cable laying apparatus as defined in claim 7, further including means releaseably securing said divider component in cable laying position with said sidewall members, said divider side plate and cable guiding plates defining a plurality of laterally open channels upon withdrawal from said sidewalls to facilitate the insertion or removal of cables.

9. The cable laying apparatus as defined in claim 8, characterized by said divider component being pivotally supported on said sidewall members to enable pivotal withdrawal upon disengagement of said releaseable securing means.

* * * * *